United States Patent
Hood et al.

(10) Patent No.: US 7,289,317 B2
(45) Date of Patent: Oct. 30, 2007

(54) METHOD AND APPARATUS FOR MOUNTING A DRIVE IN A CHASSIS

(75) Inventors: Charles D. Hood, Cedar Park, TX (US); Robert D. Hrehor, Jr., Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/626,108

(22) Filed: Jan. 23, 2007

(65) Prior Publication Data

US 2007/0115587 A1    May 24, 2007

Related U.S. Application Data

(63) Continuation of application No. 11/021,430, filed on Dec. 23, 2004, now Pat. No. 7,200,003.

(51) Int. Cl.
  *G06F 1/16* (2006.01)
(52) U.S. Cl. .................................. 361/685; 360/97.02
(58) Field of Classification Search ............. 361/685; 360/137, 97.02
  See application file for complete search history.

(56) References Cited

U.S. PATENT DOCUMENTS

| | | | | |
|---|---|---|---|---|
| 5,513,068 A | * | 4/1996 | Girard | 361/685 |
| 5,748,442 A | * | 5/1998 | Toor | 361/685 |
| 6,075,694 A | * | 6/2000 | Mills et al. | 361/685 |
| 6,122,173 A | | 9/2000 | Felcman et al. | |
| 6,362,955 B2 | * | 3/2002 | Felcman et al. | 361/685 |
| 6,580,604 B1 | * | 6/2003 | McAnally et al. | 361/685 |
| 6,618,247 B2 | | 9/2003 | Felcman et al. | |
| 7,200,003 B2 | * | 4/2007 | Hood et al. | 361/685 |

* cited by examiner

*Primary Examiner*—Lisa Lea-Edmonds
(74) *Attorney, Agent, or Firm*—Haynes and Boone, LLP

(57) ABSTRACT

According to one embodiment, a drive mounting system includes a drive chassis having a first wall and a second wall transverse to the first wall. A third wall is supported in the chassis and movable between a first position opposite the first wall and a second position opposite the second wall. A drive is mounted in the chassis in a first orientation supported by the first and third walls in response to the third wall being in the first position, and the drive is movable to a second orientation, transverse to the first orientation, supported by the second and third walls in response to the third wall being in the second position.

15 Claims, 18 Drawing Sheets

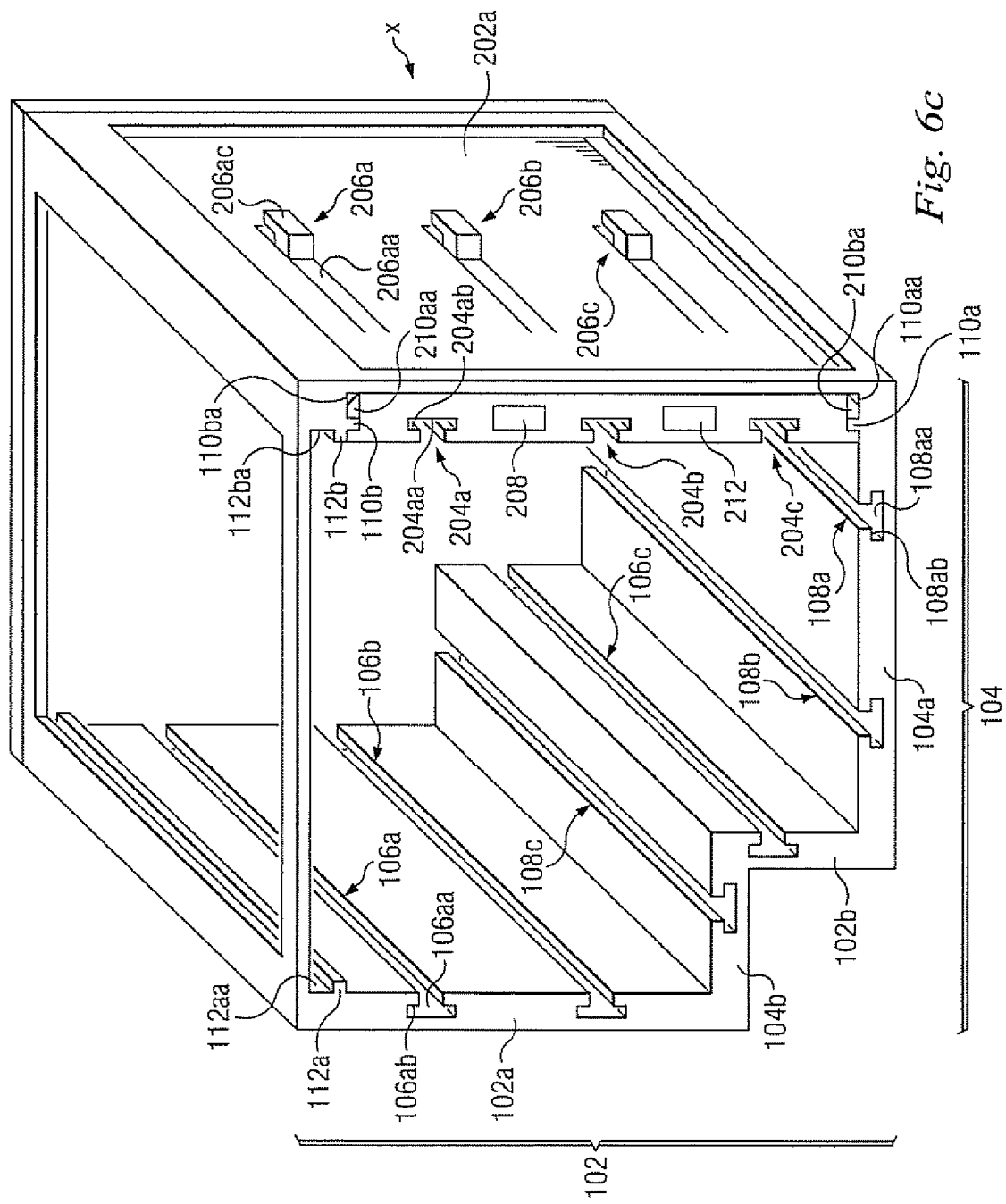

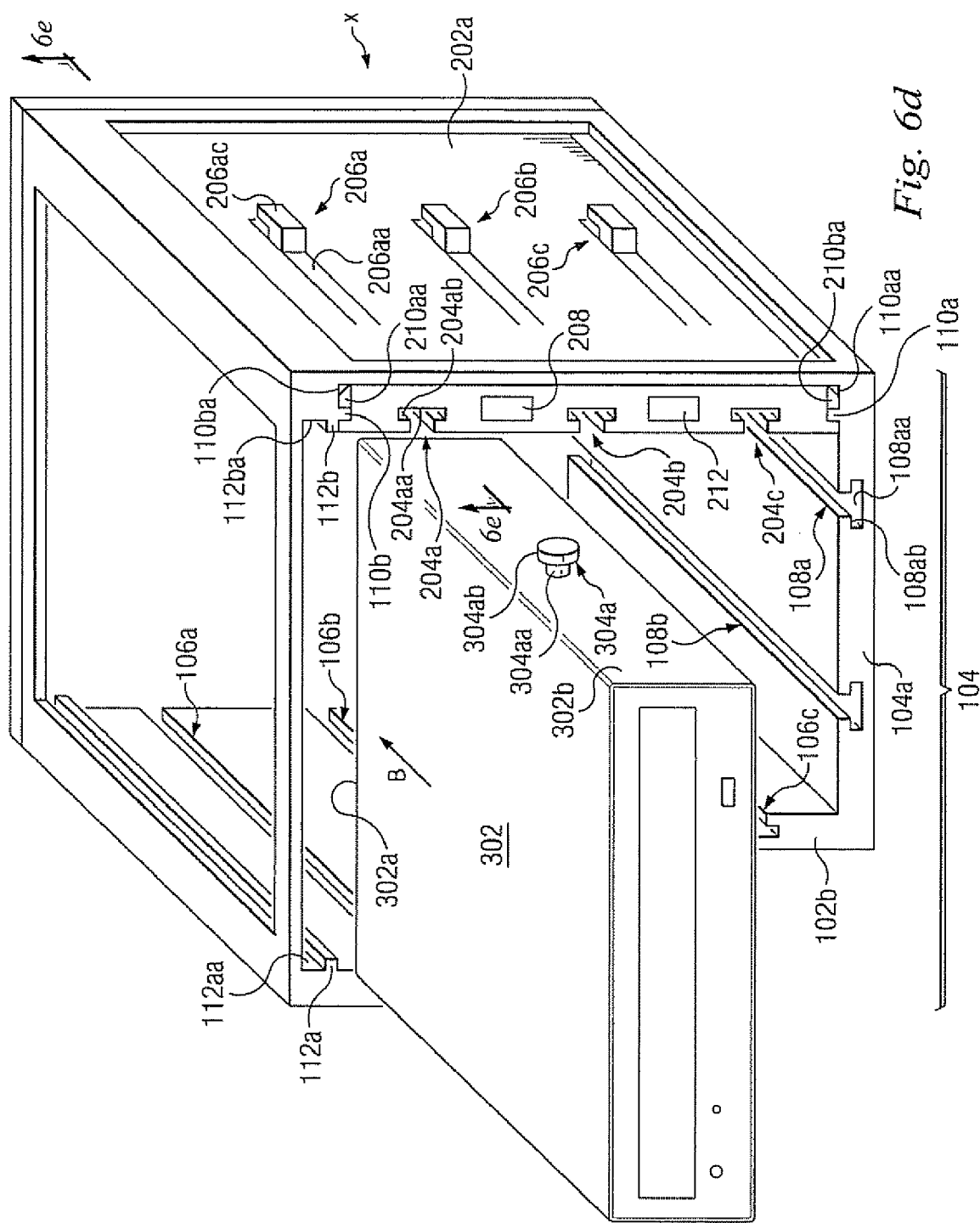

METHOD AND APPARATUS FOR MOUNTING A DRIVE IN A CHASSIS

CROSS REFERENCE TO RELATED APPLICATION

The present application is a Continuation of U.S. application Ser. No. 11/021,430, filed on Dec. 23, 2004, now U.S. Pat. No. 7,200,003 the disclosure of which is incorporated herein by reference.

BACKGROUND

The present disclosure relates generally to information handling systems, and more particularly to mounting a drive in a chassis.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include a chassis which may hold many of the components of the information handling system such as, for example, optical or floppy drives. A typical chassis may be positioned in either a horizontal or vertical configuration depending on the user's space availability. Whether the chassis is positioned in the horizontal or vertical configuration, it is desirable to position the drives horizontally for ease of use.

The drives may be mounted to the chassis such that they are positioned horizontally either when the chassis is in the horizontal position or when the chassis is in the vertical position. The user must then choose a system drive configuration which fits their space availability. However, the users space availability may change over the lifetime of the system, which can result in the relatively costly and time consuming process of reconfiguration of the drives.

Accordingly, it would be desirable to provide for mounting a drive in a chassis absent the disadvantages found in the prior methods discussed above.

SUMMARY

According to one embodiment, a drive mounting system includes a drive chassis having a first wall and a second wall transverse to the first wall. A third wall is supported in the chassis and movable between a first position opposite the first wall and a second position opposite the second wall. A drive is mounted in the chassis in a first orientation supported by the first and third walls in response to the third wall being in the first position, and the drive is movable to a second orientation, transverse to the first orientation, supported by the second and third walls in response to the third wall being in the second position.

A principal advantage of this embodiment is that drives in the information handling system chassis may be easily repositioned in the chassis when the chassis configuration is switched between horizontal and vertical.

BRIEF DESCRIPTION OF THE DRAWINGS

FIG. 3b is a bottom perspective view illustrating an embodiment of the third support wall of FIG. 3a.

FIG. 3c is a cross sectional view taken along line 3c in FIG. 3a illustrating an embodiment of a securing member on the third support wall of FIG. 3a.

FIG. 4a is a side perspective view illustrating an embodiment of an optical drive used with the drive chassis of FIG. 2 and the third support wall of FIG. 3a.

FIG. 4b is a side perspective view illustrating an embodiment of the optical drive of FIG. 4a.

FIG. 5a is a side perspective view illustrating an embodiment of a floppy drive used with the drive chassis of FIG. 2 and the third support wall of FIG. 3a.

FIG. 6b is a perspective view illustrating an embodiment of the third support wall of FIG. 3a positioned in the drive chassis of FIG. 2 in the method of FIG. 6a.

FIG. 6c is a perspective view illustrating an embodiment of the third support wall of FIG. 3a coupled to the drive chassis of FIG. 2 in the method of FIG. 6a.

FIG. 6d is a perspective view illustrating an embodiment of the optical drive of FIG. 4a positioned adjacent the drive chassis and third support wall of FIG. 6c in the method of FIG. 6a.

FIG. 6e is a cross sectional view taken along line 6e in FIG. 6d illustrating an embodiment of the optical drive of FIG. 4a being coupled to the drive chassis and third support wall of FIG. 6c in the method of FIG. 6a.

FIG. 6f is a cross sectional view taken along line 6e in FIG. 6d illustrating an embodiment of the optical drive of FIG. 4a being coupled to the drive chassis and third support wall of FIG. 6c in the method of FIG. 6a.

FIG. 6g is a cross sectional view taken along line 6e in FIG. 6d illustrating an embodiment of the optical drive of FIG. 4a coupled to the drive chassis and third support wall of FIG. 6c in the method of FIG. 6a.

FIG. 6h is a perspective view illustrating an embodiment of the optical drive of FIG. 4a coupled to the drive chassis and third support wall of FIG. 6c in the method of FIG. 6a in the method of FIG. 6a.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

Figure 1:
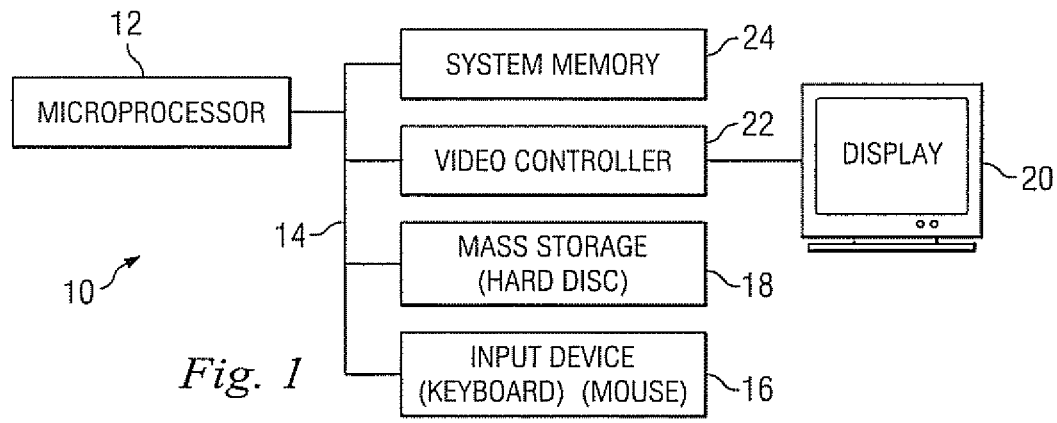
FIG. 1 is a schematic view illustrating an embodiment of an information handling system.

In one embodiment, information handling system 10, FIG. 1, includes a microprocessor 12, which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 12 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
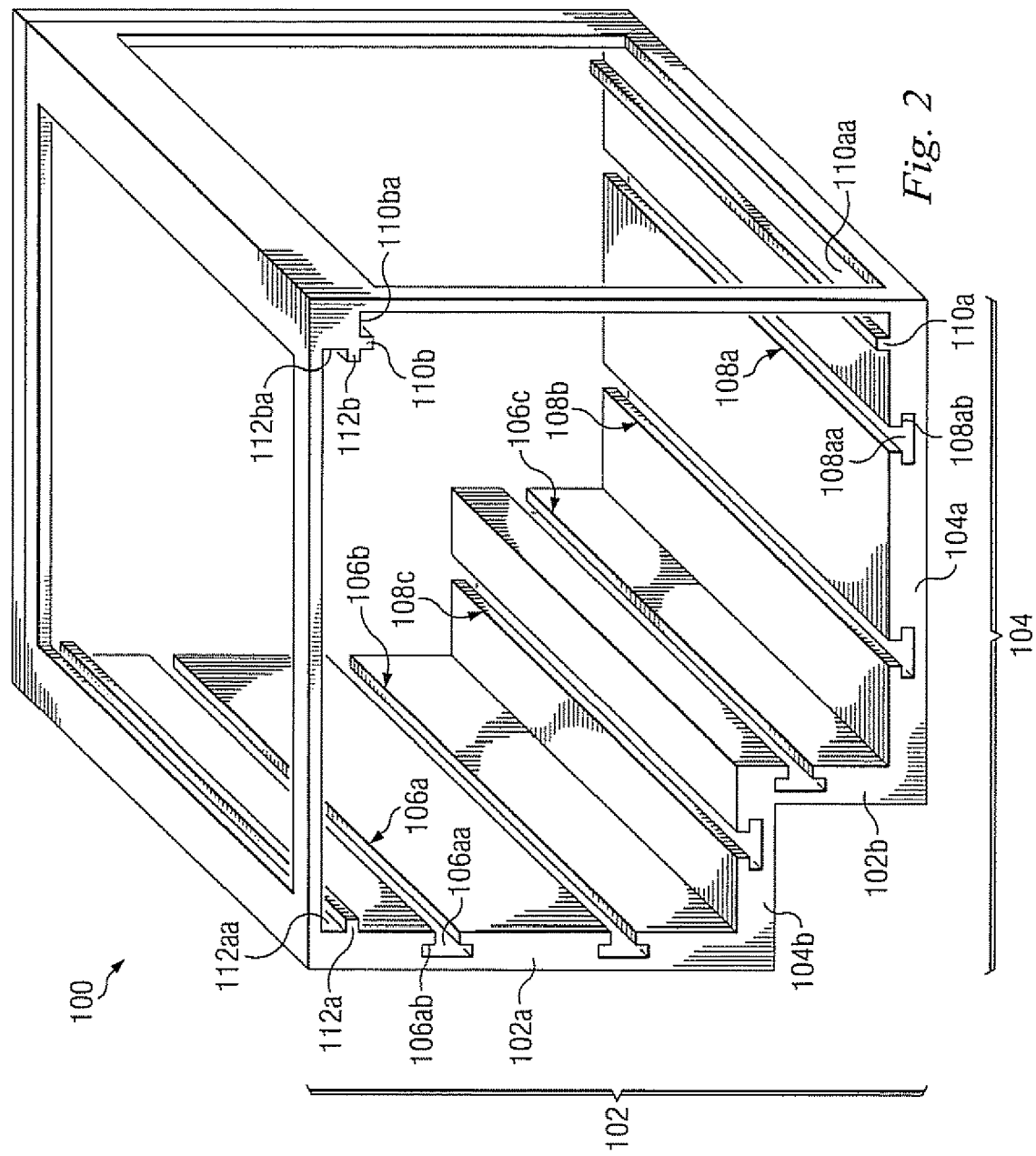
FIG. 2 is a perspective view illustrating an embodiment of a drive chassis.

Referring now to FIG. 2, a drive chassis 100 is illustrated. Drive chassis 100 includes a first support wall 102 having a section 102*a* and a section 102*b* which is substantially parallel to section 102*a* and spaced apart from section 102*a*. Drive chassis 100 also includes a second support wall 104 which is substantially transverse to the first support wall 102 and includes a section 104*a* and a section 104*b* which is substantially parallel to section 104*a* and spaced apart from section 104*a*. A plurality of first support structures 106*a*, 106*b*, 106*c* are included on the first support wall 102. First support structure 106*a* includes a channel 106*aa* defined by the first support wall 102 and having a varying width such that a securing surface 106*ab* is located in the channel 106*aa*. First support structures 106*b* and 106*c* are substantially similar to first support structure 106*a*. A plurality of second support structures 108*a*, 108*b*, 108*c* are included on the second support wall 104. Second support structure 108*a* includes a channel 108*aa* defined by the second support wall 104 and having a varying width such that a securing surface 108*ab* is located in the channel 108*aa*. Second support structures 108*b* and 108*c* are substantially similar to second support structure 108*a*. A plurality of first coupling members 110*a* and 110*b* are positioned opposite the first support wall 102, with first coupling member 110*a* extending from second support wall 104 to define a first coupling channel 110*aa* and first coupling member 110*b* substantially co-planar with and spaced apart from first coupling member 110*a* and defining a first coupling channel 110*ba*. A plurality of second coupling members 112*a* and 112*b* are positioned opposite the second support wall 104, with second coupling member 112*a* extending from first support wall 102 to define a second coupling channel 112*aa* and second coupling member 112*b* substantially co-planar with and spaced apart from second coupling member 112*a* and defining a second coupling channel 112*ba*.

Figure 3A:
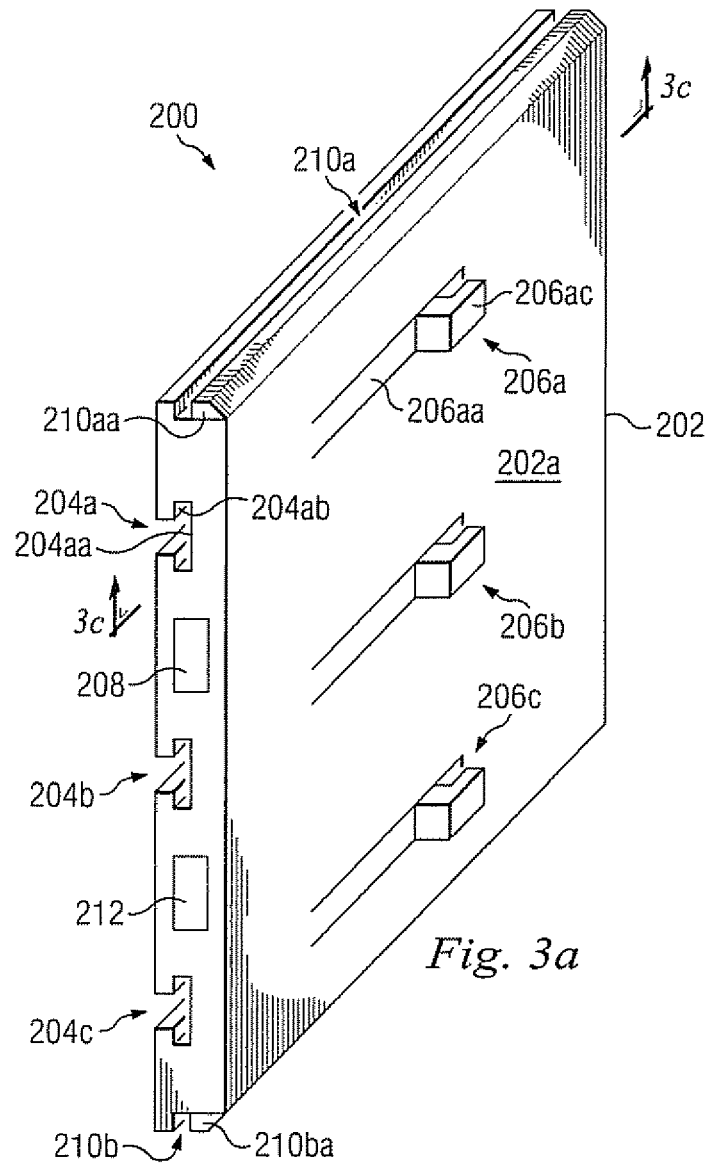
FIG. 3a is a top perspective view illustrating an embodiment of a third support wall used with the drive chassis of FIG. 2.
Figure 3B:
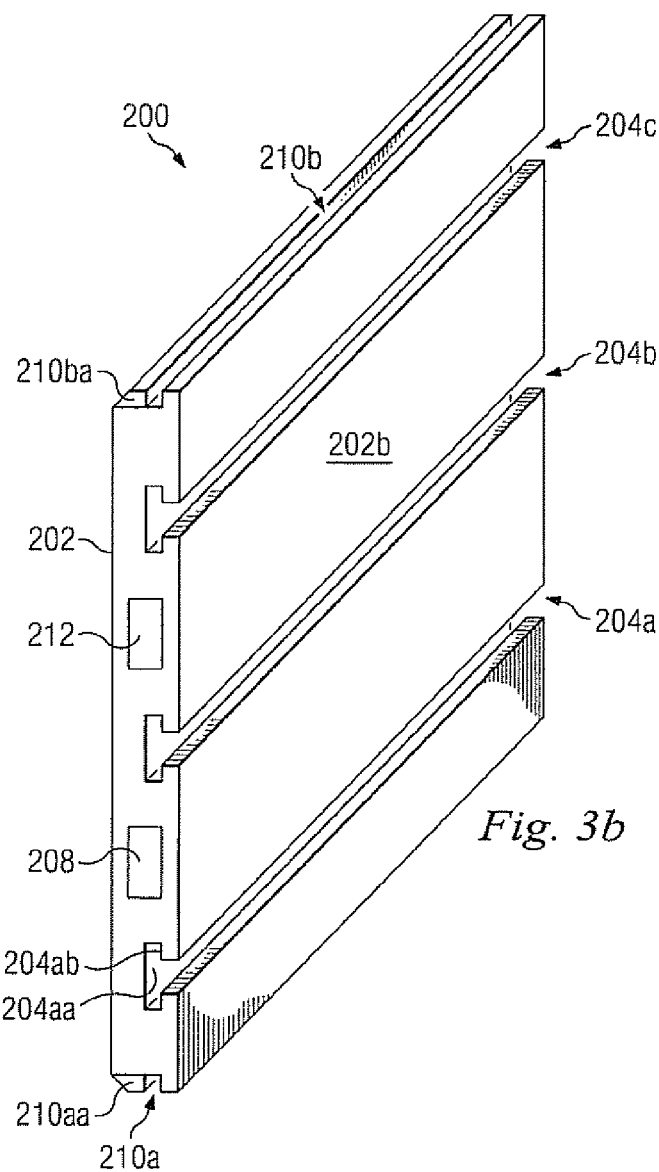
Figure 3C:
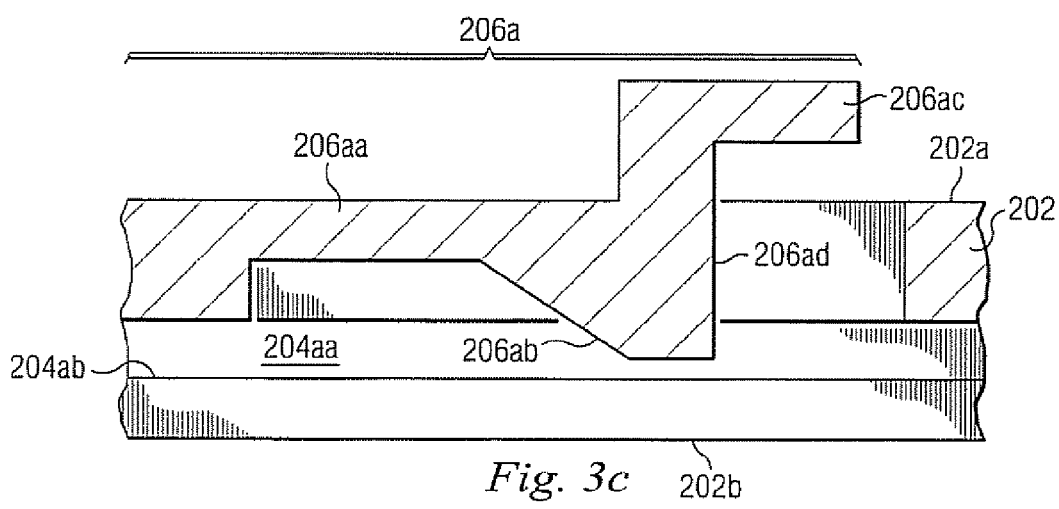

Referring now to FIGS. 3*a*, 3*b*, and 3*c*, a repositionable third support wall 200 includes a base 202 having an outer surface 202*a* and an inner surface 202*b* opposite the outer surface 202*a*. A plurality of third support structures 204*a*, 204*b*, and 204*c* are included on the third support wall 200. Third support structure 204*a* includes a channel 204*aa* defined by the base 202 of third support wall 200, positioned adjacent the inner surface 202*b*, and having a varying width such that a securing surface 204*ab* is present in the channel 204*aa*. Third support structures 204*b* and 204*c* are substantially similar to third support structure 204*a*. A plurality of securing members 206*a*, 206*b* and 206*c* are positioned adjacent the outer surface 202*a* and the third support structures 204*a*, 204*b*, and 204*c*, respectively. Securing member 206*a* includes a beam member 206*aa* extending from and along the base 202. Beam member 206*aa* includes an activation surface 206*ab* extending into the channel 204*aa* and a release tab 206*ac* and securing surface 206*ad* on its distal end. Securing members 206*b* and 206*c* are substantially similar to securing member 206*a*. A drive release actuator 208 is mounted on the third support wall 200 and is operable to actuate securing members 206*a*, 206*b*, and 206*c* surfaces, such as activation surface 206*ab*, may be moved out of the channels, such as channel 204*aa*. A plurality of coupling devices 210*a* and 210*b* are positioned on opposite sides of the base 202 of third support wall 200. Coupling device 210*a* includes a retractable coupler 210*aa* which is operable to retract into the base 202. Coupling device 210*b* includes a retractable coupler 210*ba* which is operable to retract into the base 202. A wall release actuator 212 is mounted on the third support wall 200 and is operable to actuate the retractable couplers 210aa and 210ba on coupling devices 210a and 210b, respectively, such that the retractable couplers 210aa and 210ba retract into the base 202.

Figure 4A:
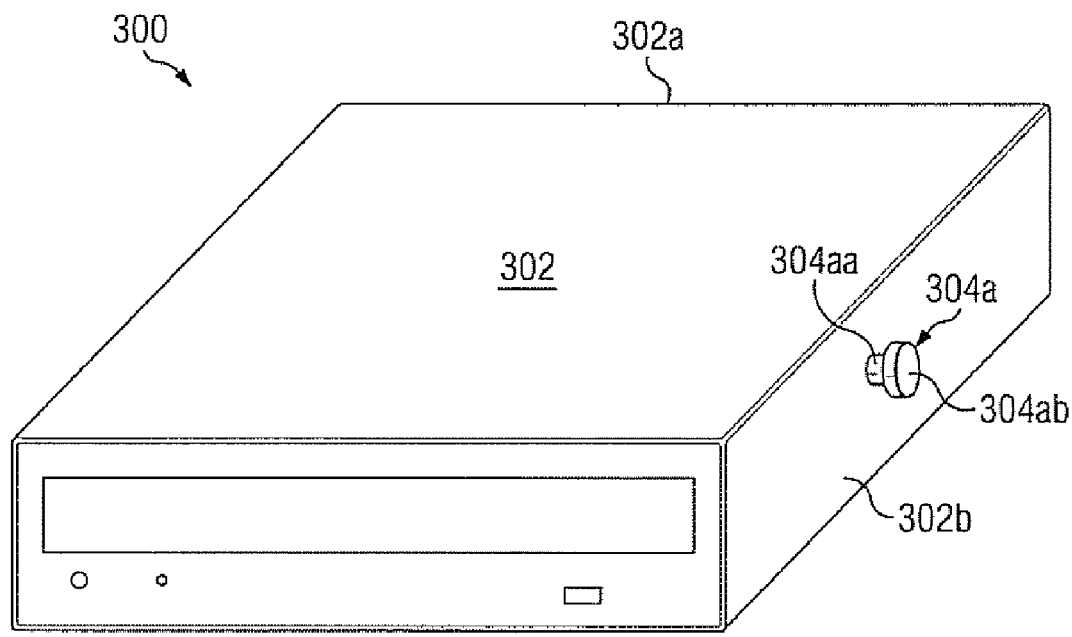
Figure 4B:
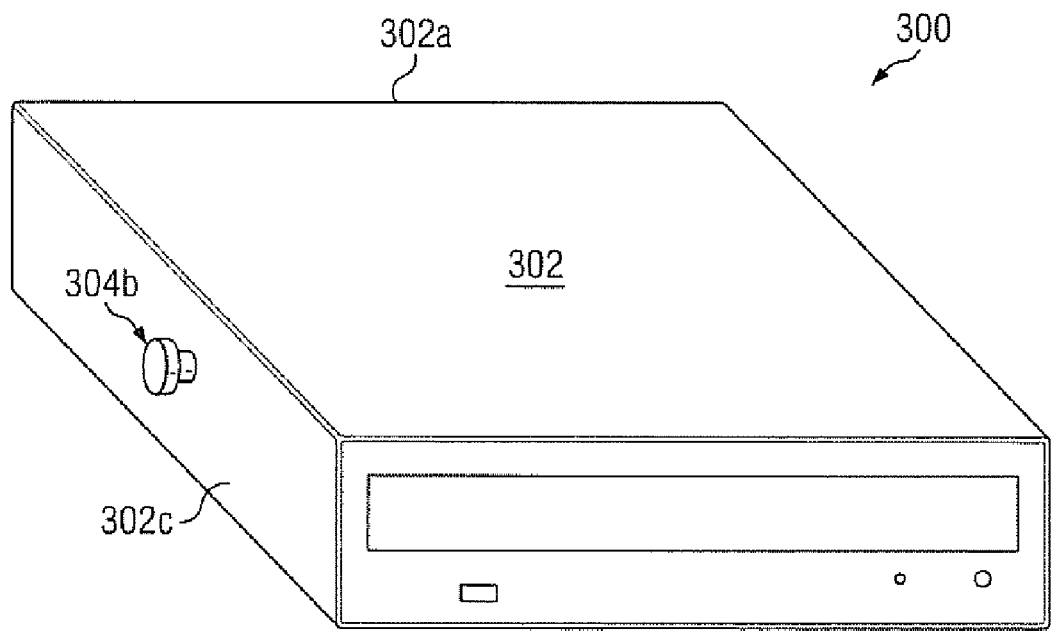

Referring now to FIGS. 4a and 4b, an optical drive 300, which may be the mass storage device 18 described above with reference to FIG. 1, includes a base 302. Base 302 includes a rear surface 302a and a plurality of opposing side surfaces 302b and 302c. A plurality of guide tabs 304a and 304b extend from the sides surfaces 302b and 302c, respectively. Guide tab 304a includes a beam portion 304aa and a head 304ab on its distal end which has a width greater than the width of the beam portion 304aa. Guide tab 304b is substantially similar to guide tab 304a. The optical drive 300 may be a variety of conventional drives known in the art which are modified to include guide tabs 304a and 304b.

Figure 5A:
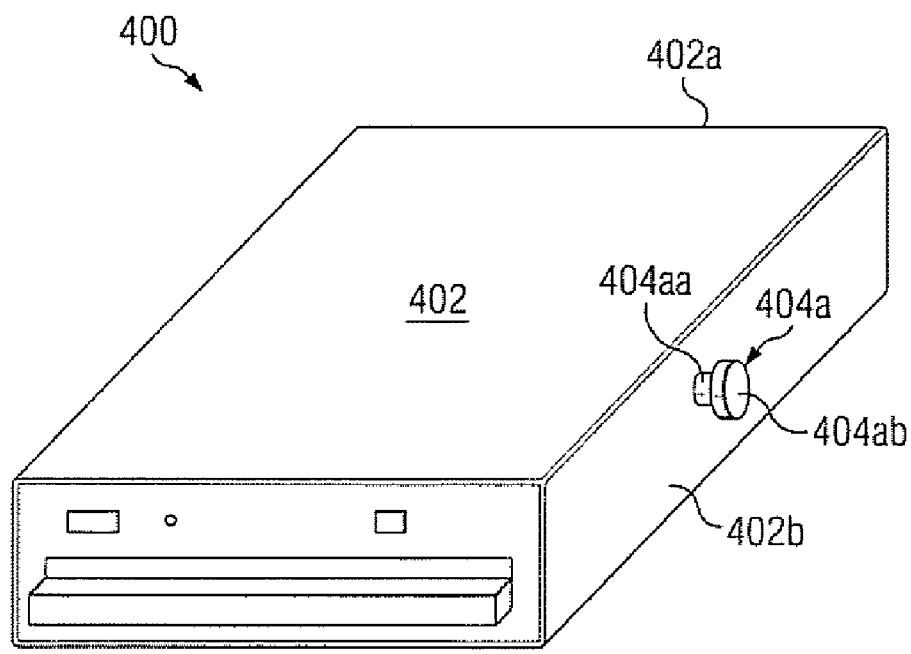
Figure 5B:
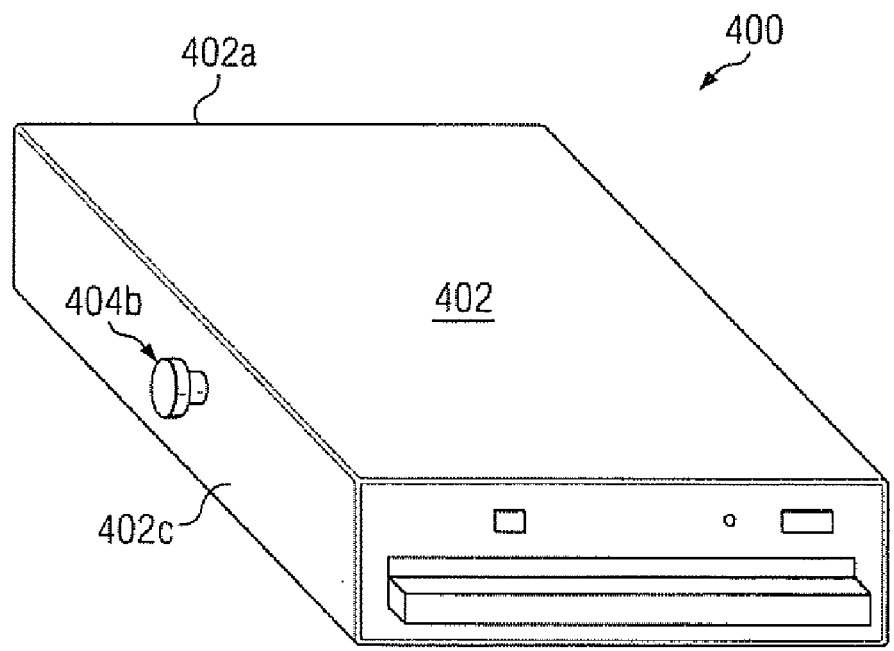
FIG. 5b is a side perspective view illustrating an embodiment of the floppy drive of FIG. 5b.

Referring now to FIGS. 5a and 5b, a floppy drive 400, which may be the mass storage device 18 described above with reference to FIG. 1, includes a base 402. Base 402 includes a rear surface 402a and a plurality of opposing side surfaces 402b and 402c. A plurality of guide tabs 404a and 404b extend from the sides surfaces 402b and 402c, respectively. Guide tab 404a includes a beam portion 404aa and a head 404ab on its distal end which has a width greater than the width of the beam portion 404aa. Guide tab 404b is substantially similar to guide tab 404a. The floppy drive 400 may be a variety of conventional drives known in the art which are modified to include guide tabs 404a and 404b.

Figure 6A:
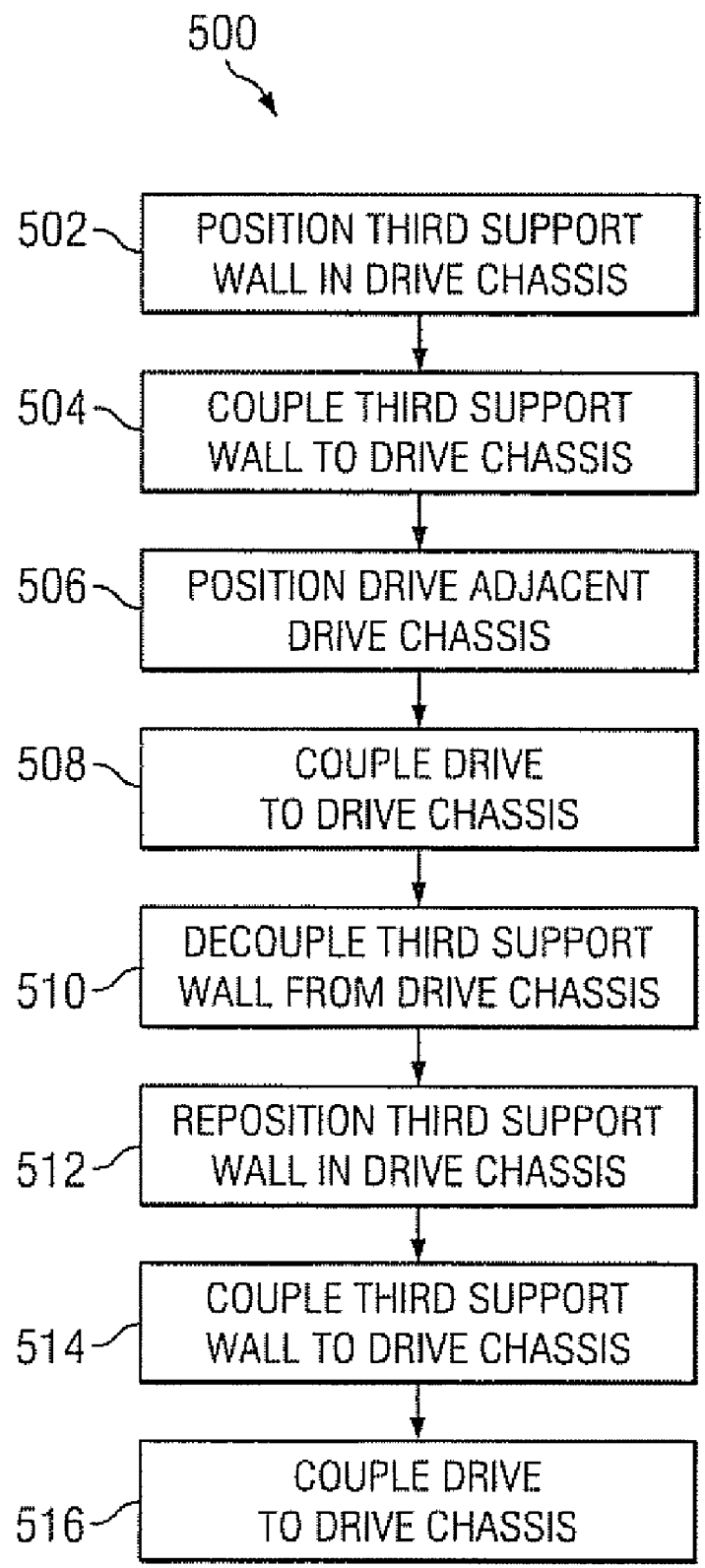
FIG. 6a is a flow chart illustrating an embodiment of a method for mounting a drive in a chassis.
Figure 6B:
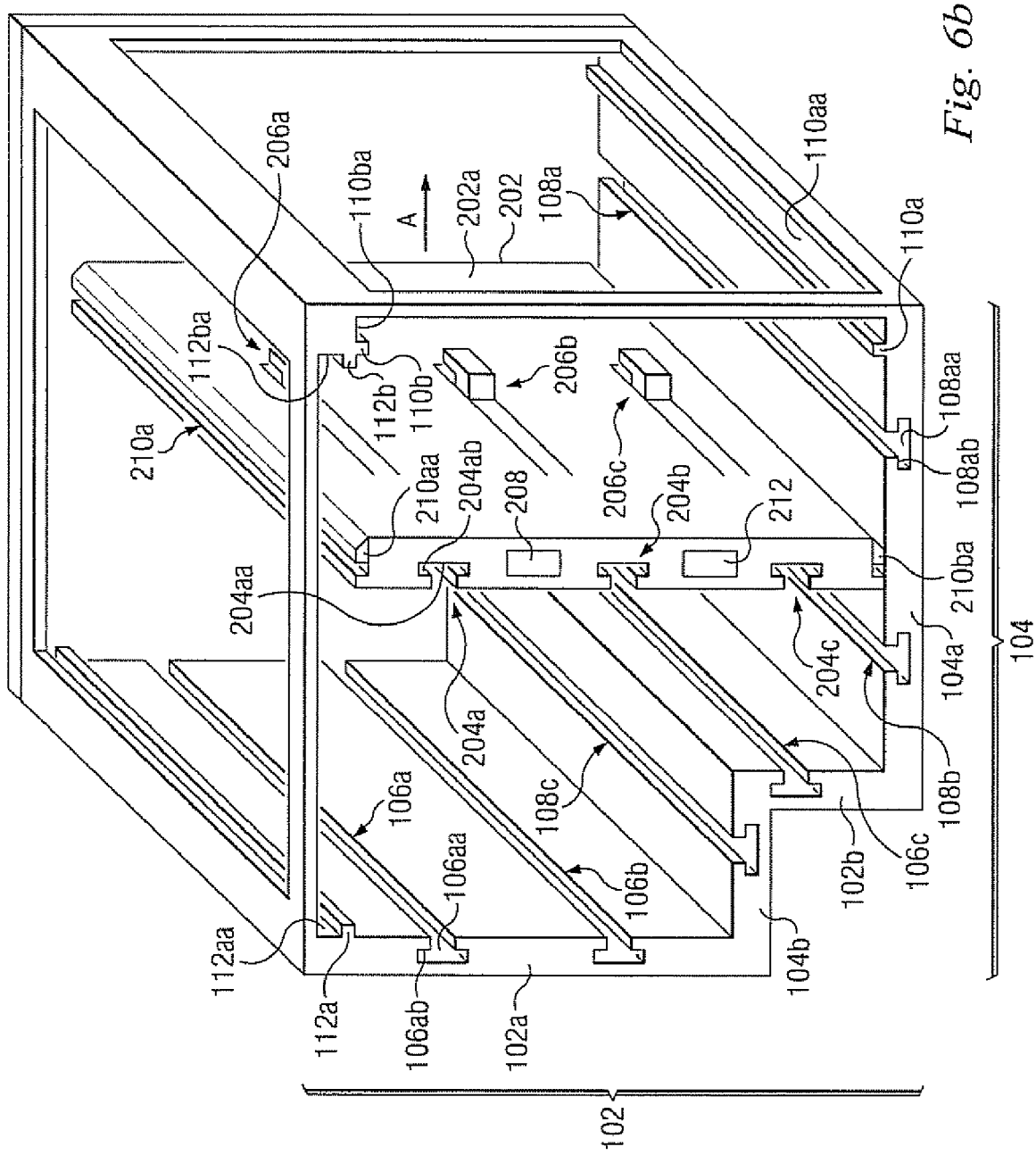
Figure 6E:
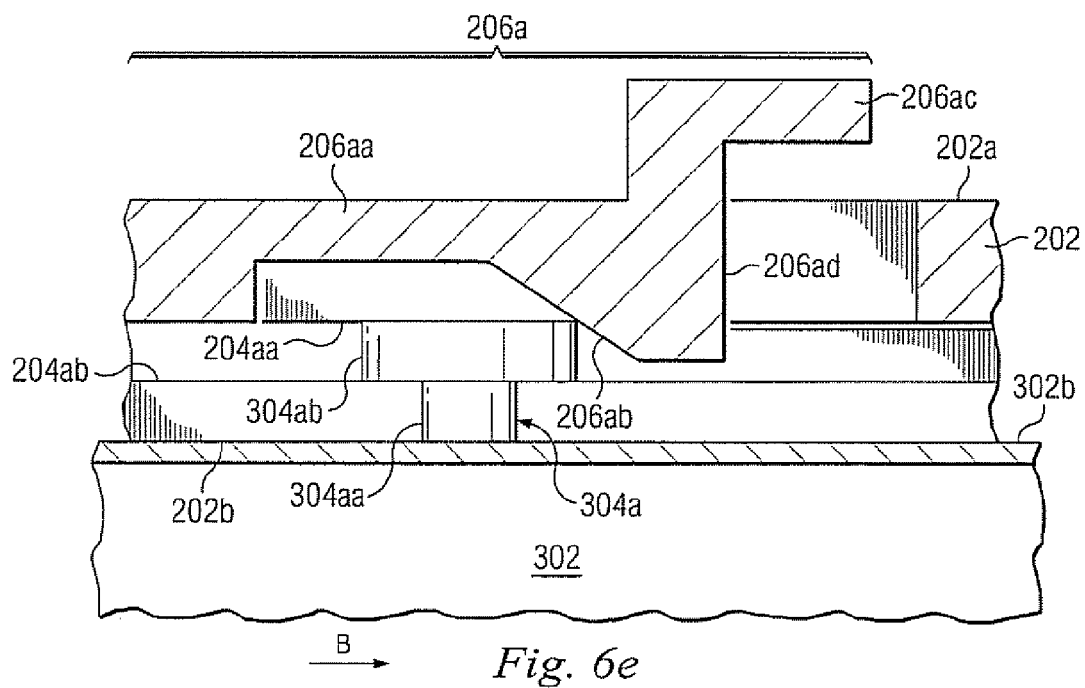

Referring now to FIGS. 6a and 6b, in operation, a method 500 for mounting a drive in a chassis begins at step 502 where the third support wall 200 is positioned in the drive chassis 100. Third support wall 200 is placed in the drive chassis 100 such that third support wall 200 is substantially parallel to first support wall 102 and substantially transverse to second support wall 104, with third support structures 204a, 204b, and 204c facing first support structures 106a, 106b, and 106c, respectively.

Referring now to FIGS. 3a, 6a, 6b, and 6c, the method 500 proceeds to step 504 where the third support wall 200 is coupled to the drive chassis 100. The third support wall 200 is moved in a direction A which is substantially perpendicular to the first support wall 102 and substantially parallel to the second support wall 104. As third support wall 200 is moved in the direction A, retractable couplers 210aa and 210ba on coupling devices 210a and 210b, respectively, are brought into engagement with first coupling members 110a and 110b on drive chassis 100. Further movement of third support wall 200 in direction A causes the retractable couplers 210aa and 210ba on coupling devices 210a and 210b, respectively, to first retract into base 202, pass first coupling members 110a and 110b, and then extend out from base 202 and into first coupling channels 110aa and 110ba. With retractable couplers 210aa and 210ba extended out into first coupling channels 110aa and 110ba, third support wall 200 is coupled to the drive chassis 100 and held in place in a first position X by first coupling members 110a and 110b. With third support wall 200 coupled to drive chassis 100, third support structure 204a is substantially aligned with first support structure 106a, third support structure 204b is substantially aligned with first support structure 106b, and third support structure 204c is substantially aligned with first support structure 106c.

Referring now to FIGS. 4b, 6a, 6c, and 6d, the method 500 proceeds to step 506 where the drive 300 is positioned adjacent the drive chassis 100. Drive 300 is positioned in front of the drive chassis 100 such that the rear surface 302a of drive 300 may enter drive chassis 100 initially, with side surface 302c adjacent first support wall 102 and side surface 302b adjacent third support wall 200. Guide tab 304a is lined up to enter channel 204aa on third support structure 204a and guide tab 304b is lined up to enter channel 106aa on first support structure 106a.

Figure 6F:
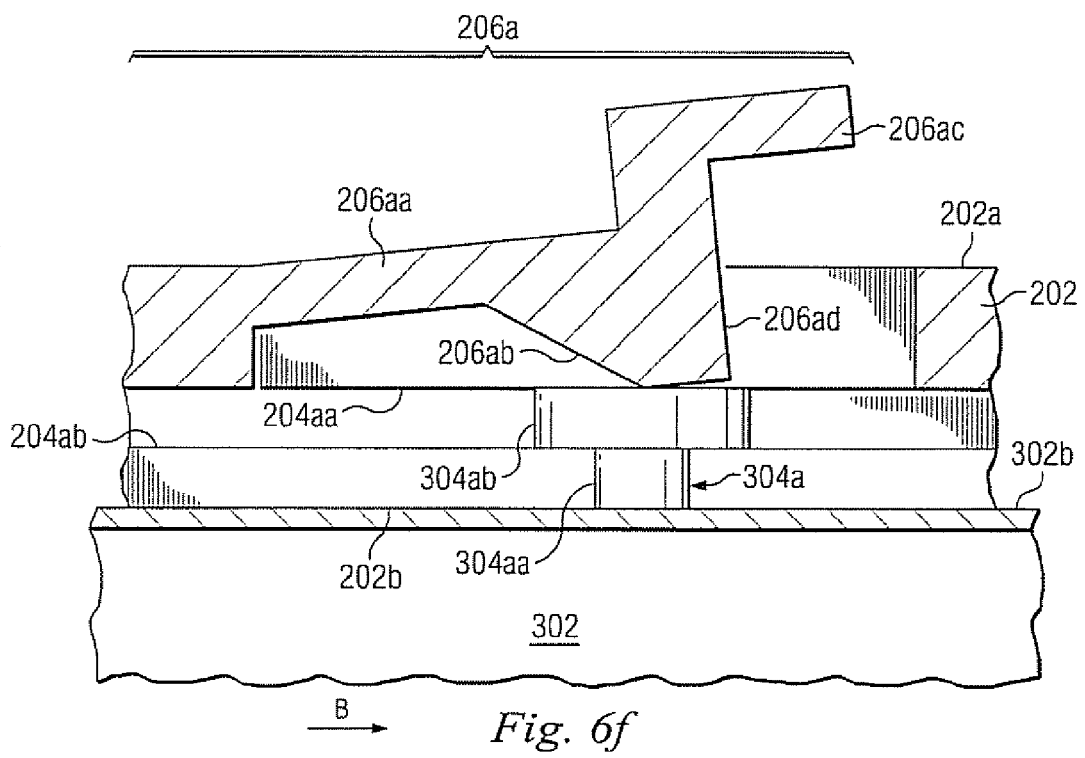
Figure 6G:
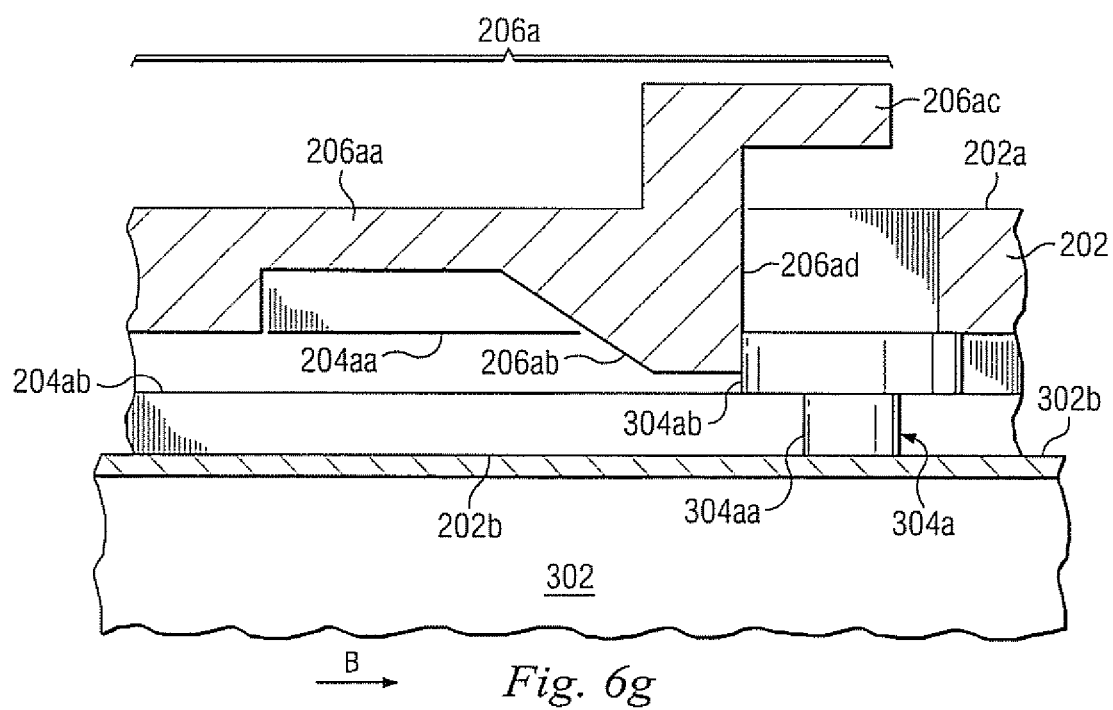
Figure 6H:
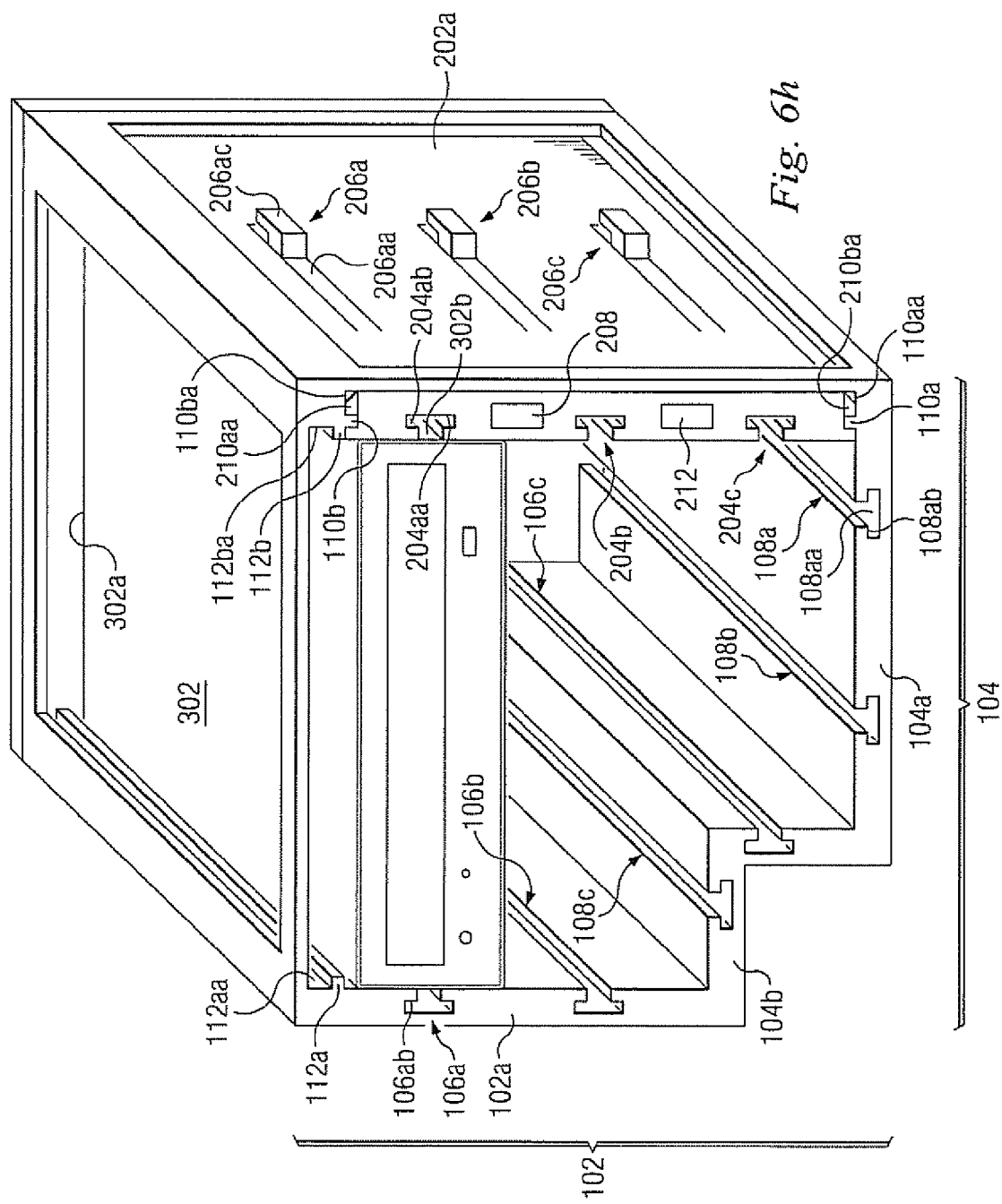

Referring now to FIGS. 4b, 6a, 6d, 6e, 6f, 6g, and 6h, the method 500 proceeds to step 508 where the drive 300 is coupled to the drive chassis 100. Drive 300 is moved in a direction B, which is substantially parallel to both the first support wall 102 and the second support wall 104. As drive 300 is moved in the direction B, guide tabs 304a and 304b enter channels 204aa and 106aa, respectively, with securing surface 106ab holding the head of guide tab 304b in channel 166aa and securing surface 204ab holding the head 304ab of guide tab 304a in channel 204aa. As guide tab 304a is moved in direction B through channel 204aa on third support structure 204a, head 304ab on guide tab 304a engages activation surface 206ab on securing member 206a. Activation surface 206ab allows guide tab 304a to deflect beam member 206aa on securing member 106a such that head 304ab on guide tab 304a may continue in direction B through the channel 204aa. Drive 300 is coupled and secured to the drive chassis 100 when head 304ab on guide tab 304a moves past securing member 206a such that beam member 206aa is allowed to deflect back to its original position and securing surface 206ad engages head 304ab, as illustrated in FIGS. 6g and 6h. The drive 300 may be decoupled from the drive chassis 100 by activating the drive release actuator 208 or the release tab 206ac to deflect the beam member 206aa such that securing surface 206ad is removed from channel 204aa, as illustrated in FIG. 6f. The drive 300 may then be moved in a direction opposite the direction B and out of the drive chassis 100.

Figure 6I:
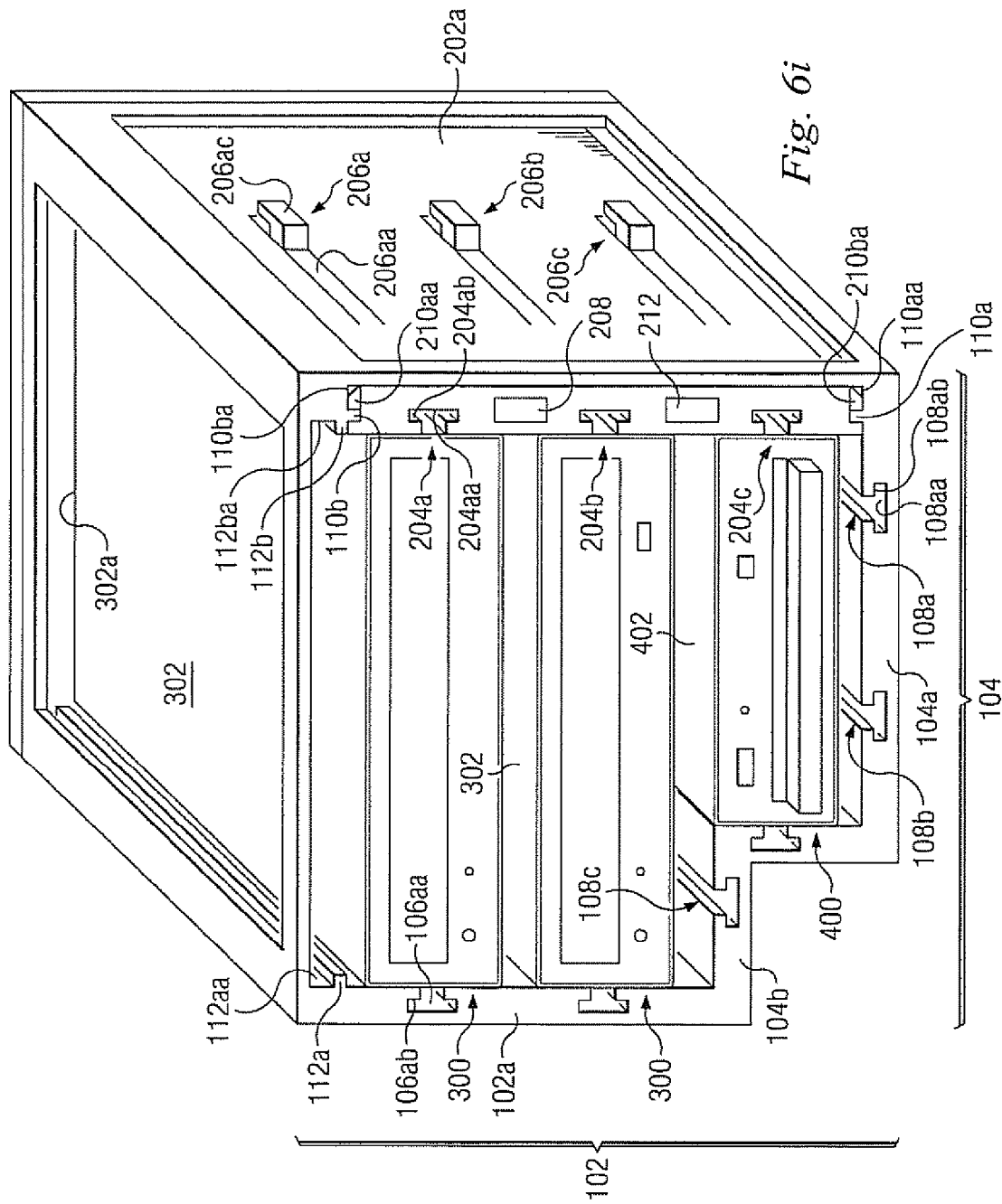
FIG. 6*i* is a perspective view illustrating an embodiment of a plurality of the optical drives of FIG. 4*a* and the floppy drive of FIG. 5*a* coupled to the drive chassis and third support wall of FIG. 6*c* in the method of FIG. 6*a*.

Referring now to FIG. 6i, in an embodiment, a plurality of drives such as, for example, a pair of the drives 300 and the drive 400, may be coupled to and decoupled from the drive chassis 100 in substantially the same manner as described above with reference to FIGS. 6d, 6e, 6f, 6g, and 6h. In an embodiment, a plurality of securing members may be provide on first support wall 102 which are substantially similar in design and operation to the securing members 206a, 206b, and 206c on third support wall 200.

Referring now to FIGS. 6a, 6b, and 6c, the method 500 proceeds to step 510 where the third support wall 200 is decoupled from the drive chassis 100. Drives such as, for example, drives 300 and 400, are removed from the drive chassis 100 as described above. The third support wall 200 may then be decoupled from the drive chassis 100 by activating the wall release actuator 212, which causes the retractable couplers 210aa and 210ba on coupling devices 210a and 210b, respectively, to retract out of channels 110aa and 110ba, respectively, and into the base 202. The third support wall 200 is now released from first coupling members 110a and 110b and may be moved in a direction opposite the direction A and then removed out of the drive chassis 100.

Figure 6J:
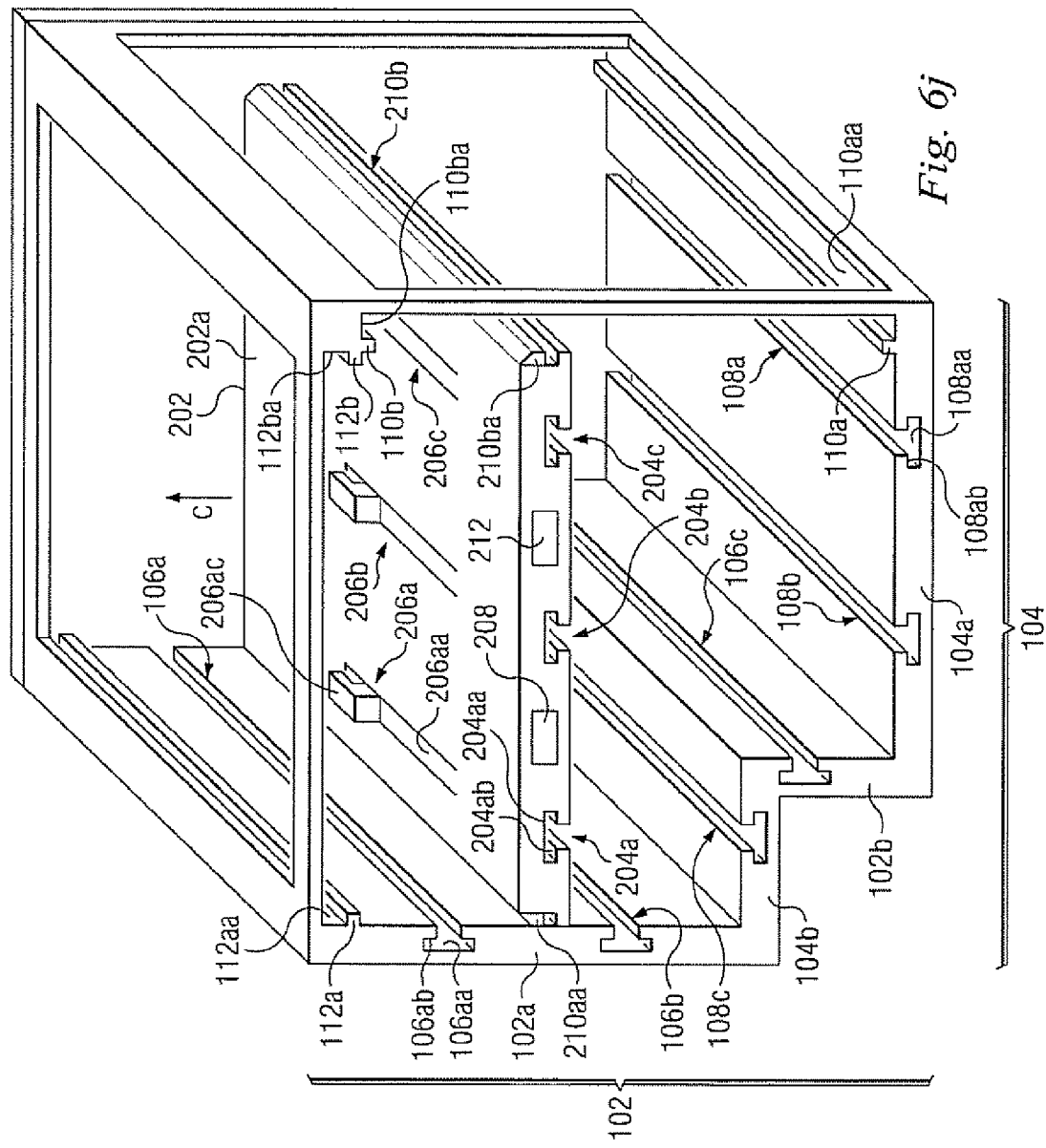
FIG. 6*j* is a perspective view illustrating an embodiment of the third support wall of FIG. 3*a* repositioned in the drive chassis of FIG. 2 in the method of FIG. 6*a*.
Figure 6K:
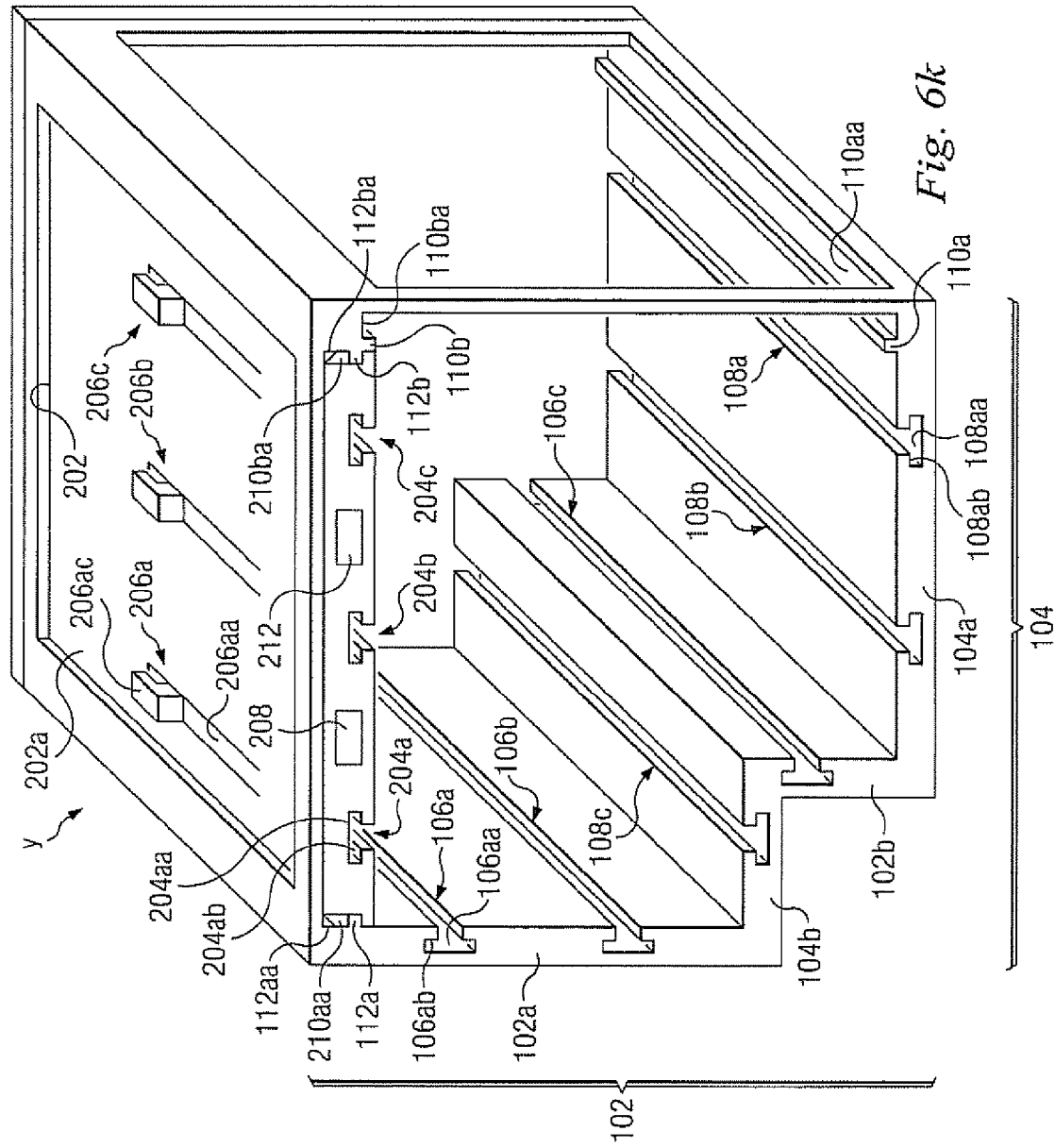
FIG. 6*k* is a perspective view illustrating an embodiment of the third support wall of FIG. 3*a* recoupled to the drive chassis of FIG. 2 in the method of FIG. 6*a*.

Referring now to FIGS. 6a and 6j, the method 500 proceeds to step 512 where the third support wall 200 is repositioned in the drive chassis 100. Third support wall 200 is placed in the drive chassis 100 such that third support wall 200 is substantially parallel to second support wall 104 and substantially transverse to first support wall 102, with third support structures 204a, 204b, and 204c facing second support structures 108c, 108b, and 108a, respectively.

Referring now to FIGS. 3a, 6a, 6j, and 6k, the method 500 proceeds to step 514 where the third support wall 200 is coupled to the drive chassis 100. The third support wall 200 is moved in a direction C which is substantially perpendicular to the second support wall 104 and substantially parallel to the first support wall 102. As third support wall 200 is moved in the direction C, retractable couplers 210aa and 210ba on coupling devices 210a and 210b, respectively, are brought into engagement with second coupling members 112a and 112b on drive chassis 100. Further movement of third support wall 200 in direction C causes the retractable couplers 210aa and 210ba on coupling devices 210a and 210b, respectively, to first retract into base 202, pass second coupling members 112a and 112b, and then extend out from base 202 and into second coupling channels 112aa and 112ba. With retractable couplers 210aa and 210ba extended out into second coupling channels 112aa and 112ba, third support wall 200 is coupled to the drive chassis 100 and held in place in a second position Y by second coupling members 112a and 112b. With third support wall 200 coupled to drive chassis 100, third support structure 204a is substantially aligned with second support structure 108c, third support structure 204b is substantially aligned with second support structure 108b, and third support structure 204c is substantially aligned with second support structure 108a.

Figure 6L:
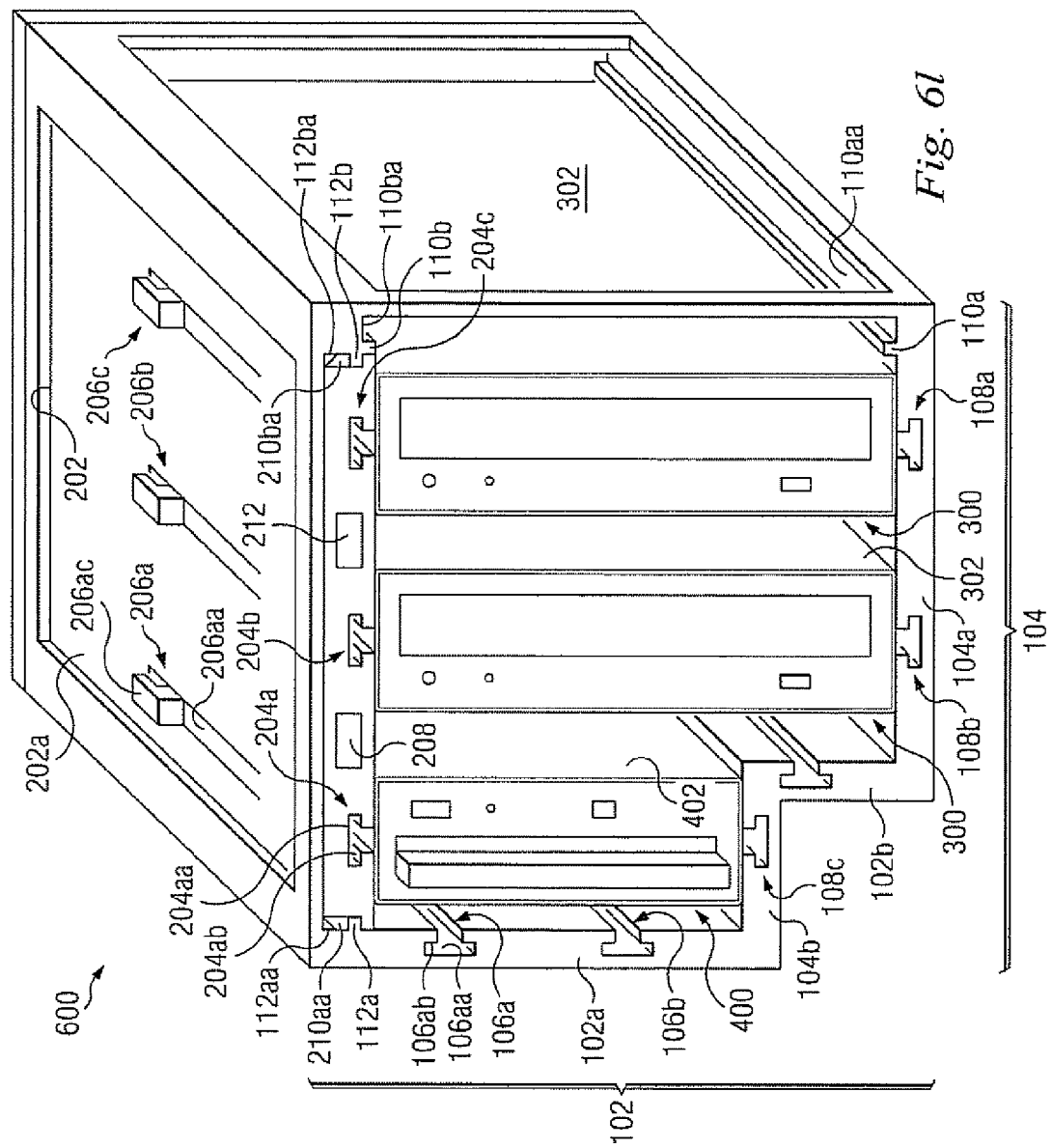
FIG. 6*l* is a perspective view illustrating an embodiment of a plurality of the optical drives of FIG. 4*a* and the floppy drive of FIG. 5*a* coupled to the drive chassis and third support wall of FIG. 6*k* in the method of FIG. 6*a*.

Referring now to FIGS. 6a and 6l, the method 500 proceeds to step 516 where the drive 300 is coupled to the drive chassis 100. Drive 300 may be coupled and decoupled to the support structures 204c and 108a on third support wall 200 and second support wall 104, respectively, in substantially the same manner as drive 300 was coupled to the support structures 204a and 106a on third support wall 200 and first support wall 102, respectively, as described above with reference to FIGS. 6d, 6e, 6f, 6g, and 6h. A plurality of drives such as, for example, a pair of the drives 300 and the drive 400, may be coupled to and decoupled from the drive chassis 100 in substantially the same manner as described above with reference to FIGS. 6d, 6e, 6f, 6g, and 6h. A plurality of securing members may be provide on second support wall 104 which are substantially similar in design and operation to the securing members 206a, 206b, and 206c on third support wall 200. In an embodiment, the drive chassis 100 and the third support wall 200 provide a drive mounting apparatus 600 which may also include one or both of drives 300 and/or the drive 400.

Figure 7A:
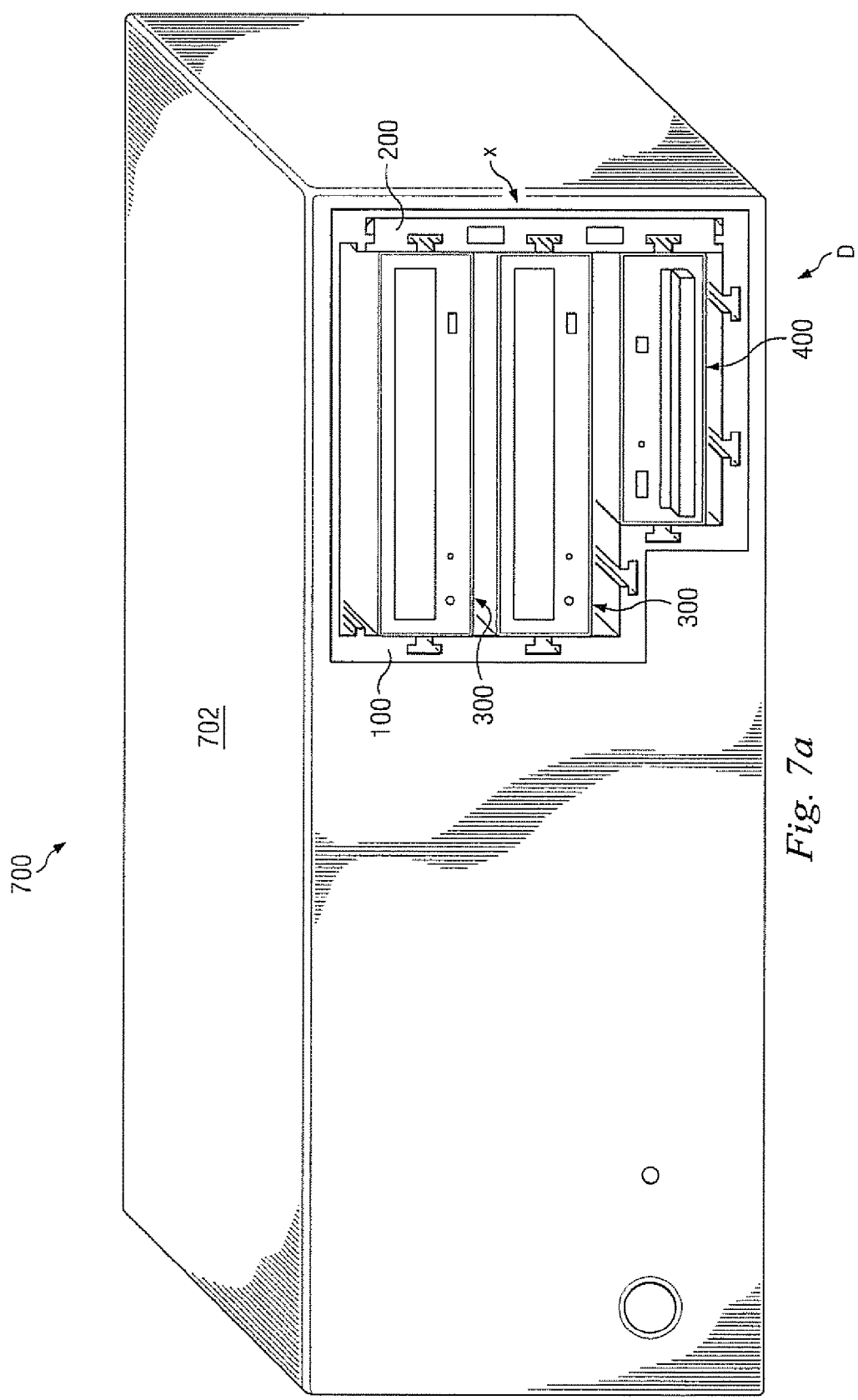
FIG. 7*a* is a perspective view illustrating an embodiment of the drive chassis of FIG. 2, the third support wall of FIG. 3*a*, and the drives of FIGS. 4*a* and 5*a* in a system chassis in a horizontal position.
Figure 7B:
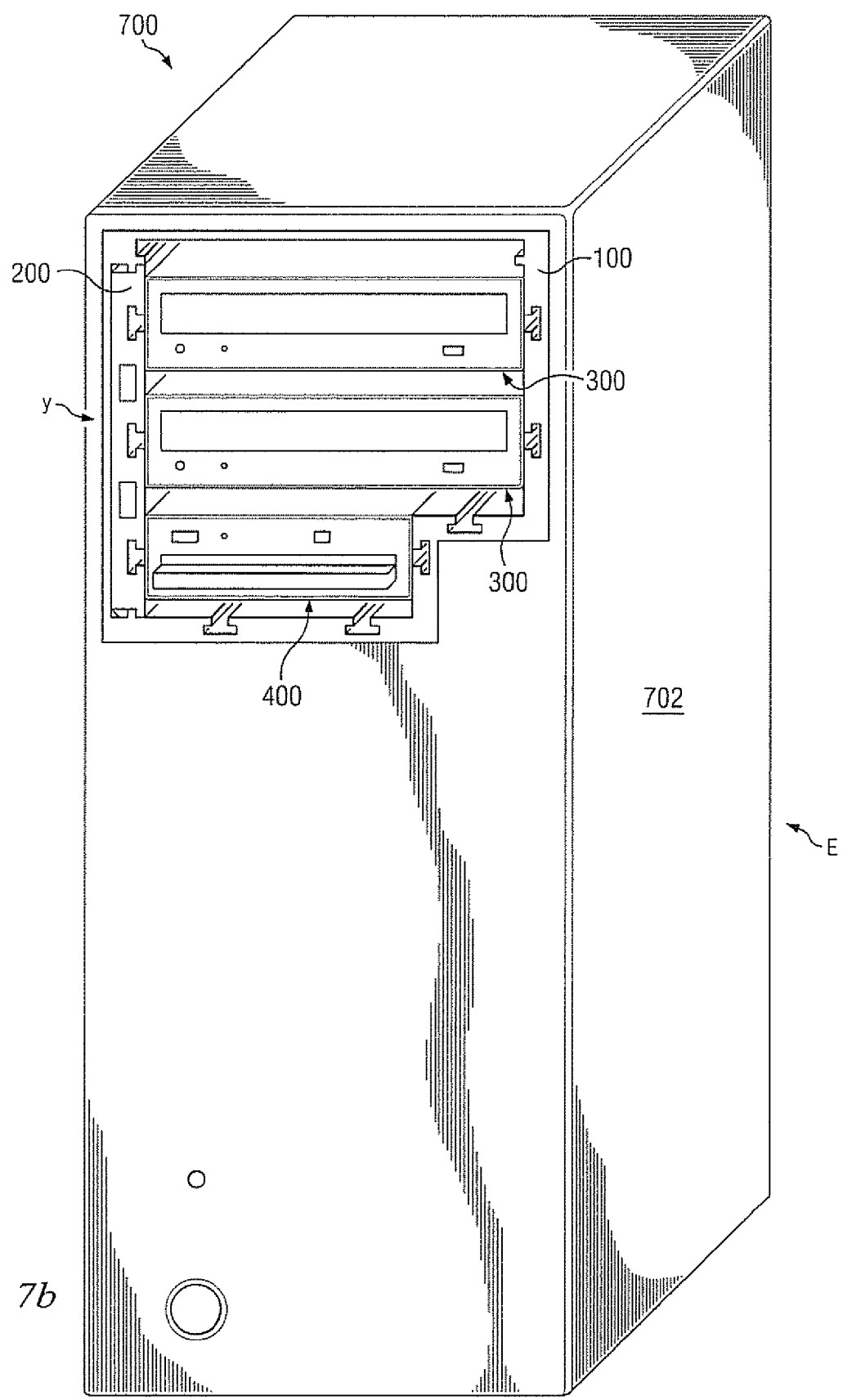
FIG. 7*b* is a perspective view illustrating an embodiment of the drive chassis of FIG. 2, the third support wall of FIG. 3*a*, and the drives of FIGS. 4*a* and 5*a* in a system chassis in a vertical position.

Referring now to FIGS. 7a and 7b, an alternative embodiment of a drive mounting apparatus 700 is substantially identical in structure and operation to the drive mounting apparatus described above with reference to FIGS. 1, 2, 3a, 3b, 3c, 4a, 4b, 5a, 5b, 6a, 6b, 6c, 6d, 6e, 6f, 6g, 6h, 6i, 6j, 6k, and 6l, with the addition of a system chassis 702 which is operable to be positioned in a horizontal position D or a vertical position E. In an embodiment, the system chassis 702 may house some or all of the component of an information handling system such as, for example, the information handling system 10 described above with reference to FIG. 1. In operation, with the system chassis 702 in the horizontal position D, drives such as, for example, the plurality of the drives 300 and the drive 400, may be positioned horizontally with the third support wall 200 in position X. The system chassis 702 may then be repositioned to the vertical position E, and the drives 300 and 400 may be positioned horizontally with the third support wall 200 in position Y.

It is understood that variations may be made in the foregoing without departing from the scope of the disclosed embodiments. Furthermore, the elements and teachings of the various illustrative embodiments may be combined in whole or in part some or all of the illustrated embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A drive mounting system comprising:
  a drive chassis including a first wall and a second wall transverse to the first wall; and
  a third wall supported in the chassis and movable between a first position opposite the first wall and a second position opposite the second wall.

2. The system as defined in claim 1 further comprising:
  a drive mounted in the chassis in a first orientation supported by the first and third walls in response to the third wall being in the first position, and movable to a second orientation, transverse to the first orientation, supported by the second and third walls in response to the third wall being in the second position.

3. The system as defined in claim 1, further comprising:
  each wall including a plurality of channels, and the drive having tabs slidably received by the channels.

4. The system as defined in claim 3 further comprising:
  a drive securing member on at least one of opposite walls for releasably engaging the tabs.

5. The system as defined in claim 4, further comprising:
  a drive release actuator for moving the drive securing member to a position for disengaging the tabs.

6. An information handling system comprising:
  a system chassis operable to be positioned in one of a horizontal and a vertical position;
  a drive chassis including a first wall and a second wall transverse to the first wall; and
  a third wall supported in the chassis and movable between a first position opposite the first wall and a second position opposite the second wall.

7. The system as defined in claim 6 further comprising:
  a drive mounted in the chassis in a first orientation supported by the first and third walls in response to the third wall being in the first position, and movable to a second orientation, transverse to the first orientation, supported by the second and third walls in response to the third wall being in the second position.

8. The system as defined in claim 6, further comprising:
  each wall including a plurality of channels, and the drive having tabs slidably received by the channels.

9. The system as defined in claim 8 further comprising:
  a drive securing member on at least one of opposite walls for releasably engaging the tabs.

10. The system as defined in claim 9, further comprising:
  a drive release actuator for moving the drive securing member to a position for disengaging the tabs.

11. A method for mounting a drive in multiple positions in a drive chassis comprising:
  providing a drive chassis including a first wall and a second wall transverse to the first wall; and
  providing a third wall supported in the chassis and movable between a first position opposite the first wall and a second position opposite the second wall.

12. The method as defined in claim 11 further comprising:
  a drive mounted in the chassis in a first orientation supported by the first and third walls in response to the third wall being in the first position, and movable to a second orientation, transverse to the first orientation, supported by the second and third walls in response to the third wall being in the second position.

13. The method as defined in claim 11, further comprising:
providing each wall with a plurality of channels, and the drive having tabs slidably received by the channels.

14. The method as defined in claim 13 further comprising:
providing a drive securing member on at least one of opposite walls for releasably engaging the tabs.

15. The method as defined in claim 14 further comprising:
providing a drive release actuator for moving the drive securing member to a position for disengaging the tabs.

* * * * *